United States Patent
Krishnan

(10) Patent No.: US 12,513,729 B2
(45) Date of Patent: *Dec. 30, 2025

(54) UPLINK PERFORMANCE FOR BEARERS

(71) Applicant: T-Mobile USA, Inc., Bellevue, WA (US)

(72) Inventor: Reman Krishnan, Charlotte, NC (US)

(73) Assignee: T-Mobile USA, Inc., Bellevue, WA (US)

( * ) Notice: Subject to any disclaimer, the term of this patent is extended or adjusted under 35 U.S.C. 154(b) by 460 days.

This patent is subject to a terminal disclaimer.

(21) Appl. No.: 17/476,282

(22) Filed: Sep. 15, 2021

(65) Prior Publication Data

US 2022/0007377 A1    Jan. 6, 2022

Related U.S. Application Data

(63) Continuation of application No. 16/236,779, filed on Dec. 31, 2018, now Pat. No. 11,153,887.

(51) Int. Cl.
*H04W 72/21* (2023.01)
*H04W 72/542* (2023.01)

(52) U.S. Cl.
CPC ......... *H04W 72/542* (2023.01); *H04W 72/21* (2023.01)

(58) Field of Classification Search
CPC . H04W 72/542; H04W 72/21; H04W 72/569; H04W 24/02; H04W 72/54; H04W 24/08
See application file for complete search history.

(56) References Cited

U.S. PATENT DOCUMENTS

| 11,153,887 B2 | 10/2021 | Krishnan | |
|---|---|---|---|
| 2010/0046369 A1* | 2/2010 | Zhao | H04W 28/24 370/232 |

(Continued)

FOREIGN PATENT DOCUMENTS

| KR | 20130045293 A | 5/2013 |
|---|---|---|
| WO | 2015013939 A1 | 2/2015 |

OTHER PUBLICATIONS

International Searching Authority, International Search Report and Written Opinion, PCT Patent Application PCT/US2019/066093, mailed Jun. 3, 2020, 15 pages.

(Continued)

*Primary Examiner* — Derrick W Ferris
*Assistant Examiner* — M Mostazir Rahman
(74) *Attorney, Agent, or Firm* — Perkins Coie LLP

(57) ABSTRACT

A system and method for detecting and correcting uplink-only problems is disclosed. The system comprises one or more of the following modules: uplink problem detection module, maximum permissible limit module, and uplink improvement calculation and actions module. The uplink problem detection module detects uplink-only problems using values of one or more parameters related to bearer performance. For instance, the uplink problem detection module continuously monitors the uplink performance by checking uplink transmission error and when a threshold is crossed, declares an uplink problem. The maximum permissible limit module limits the actions by uplink improvement calculation and actions module so that other parts in the system are not negatively affected. The uplink improvement calculation and actions module determines and performs the actions to improve the uplink transmission error situation detected by the uplink problem detection module.

19 Claims, 4 Drawing Sheets

(56) References Cited

U.S. PATENT DOCUMENTS

| | | |
|---|---|---|
| 2010/0322069 A1 | 12/2010 | Song et al. |
| 2013/0023281 A1 | 1/2013 | Meredith et al. |
| 2013/0242887 A1* | 9/2013 | Zhu ................. H04L 67/568 |
| | | 370/329 |
| 2014/0011535 A1* | 1/2014 | Jeon .................. H04W 52/241 |
| | | 455/522 |
| 2015/0003435 A1 | 1/2015 | Horn et al. |
| 2016/0359750 A1 | 12/2016 | Miklós et al. |
| 2017/0295591 A1* | 10/2017 | Nguyen ............... H04W 72/12 |
| 2018/0110031 A1* | 4/2018 | Yoshizawa ......... H04J 13/0007 |
| 2020/0389907 A1* | 12/2020 | Jeon .................. H04W 72/543 |

OTHER PUBLICATIONS

European Patent Office, Extended European Search Report, EP Patent Application 19906761.2, mailed Aug. 31, 2022, 14 pages.

\* cited by examiner

UPLINK PERFORMANCE FOR BEARERS

CROSS-REFERENCE TO RELATED APPLICATIONS

This application is a continuation of U.S. patent application Ser. No. 16/236,779, filed Dec. 31, 2018, entitled UPLINK PERFORMANCE FOR BEARERS, which is hereby incorporated by reference in its entirety.

BACKGROUND

In telecommunication networks such as LTE, the radio uplink and downlink are the transmission paths between mobile devices and cell sites (for example, eNodeB (eNB). Traffic and signaling flows in both uplink and downlink. Through the radio uplink and downlink, information flows through multiple virtual data pipes called as bearers. Bearers define how UE data is treated when it travels across a telecommunication network. The telecommunication network can treat some data in a special way and treat others normally. A bearer is a set of network parameters that defines data specific treatment. For example, some flow of data might be provided at a guaranteed bit rate while other data faces low bit rate transfer.

Bearers can be allocated different priority levels. For instance, an allocation and retention (ARP) parameter in a quality of service (QoS) profile defines the relative importance of a bearer (requested) compared to other existing bearers. An ARP parameter comprises three components: priority level, pre-emption capability, and pre-emption vulnerability. Priority level defines the importance of a bearer in relation to other bearers. Pre-emption capability defines the capability of the requested bearer to pre-empt (remove) existing bearers having low priority in the network, that is, the high priority bearer can delete lower priority bearers. Pre-emption vulnerability defines the capability of a bearer to get pre-empted or deleted by other high priority bearers, that is, the capability to get deleted by other bearers. When a new bearer is needed in an LTE network with insufficient resources, an LTE entity (for example, P-GW, S-GW or eNB) decides, based on ARP priority level (an integer ranging from 1 to 15, with 1 being the highest level of priority), whether to remove the existing bearer and create a new one (for example, by removing an EPS bearer with low priority ARP to create one with high priority ARP), or refuse to create a new one.

The ARP is considered only when deciding whether to create a new bearer. Once a new bearer is created and packets are delivered through it, the ARP does not affect the priority of the delivered packet, and thus the network node/entity forwards the packets regardless of their ARP values.

Between radio uplink and downlink, uplink is a weaker link. In conventional networks, cellular carriers employ various techniques to improve uplink situations to save all uplink bearers. The priority bearers (least ARP) are not specially treated in these techniques and hence suffer from low quality communication. This results in providing users using priority bearers with a low quality experience, such as dropped connections, low throughput among other drawbacks.

Figure 1:
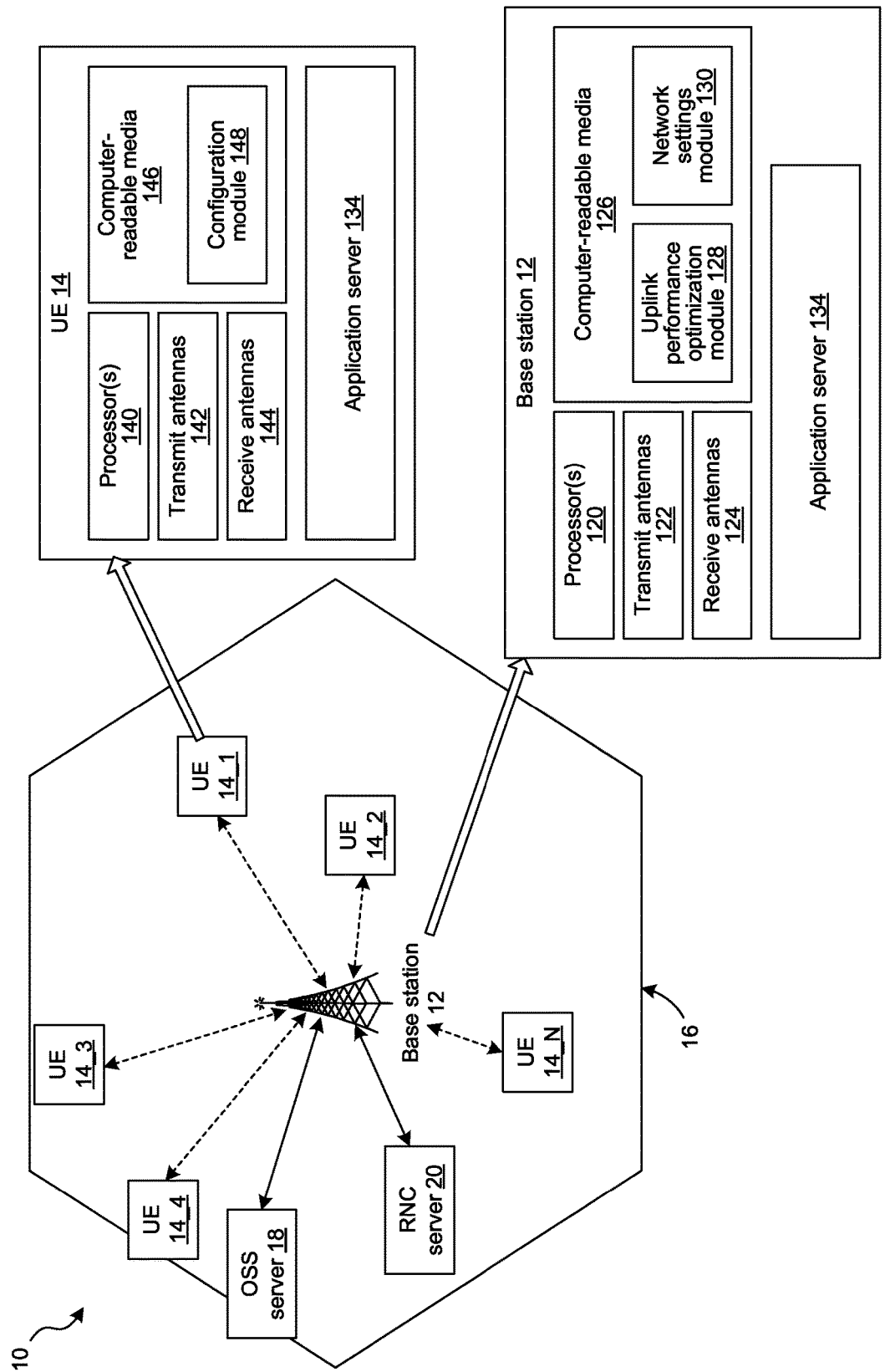
FIG. 1 illustrates a communication network, in accordance with various implementations.

Some components and/or operations may be separated into different blocks or combined into a single block for the purposes of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Conventional solutions do not address uplink problems for certain bearers alone, such as priority bearers (lower ARP). Priority bearers are used by carriers typically for emergency services (911 and WPS in the US) and for VIP users. A lack of special treatment for priority bearers negatively impacts the user experience of high priority customers. Considering these problems, as well as others, the inventors have recognized that it would be beneficial to have systems and methods that provide special treatment (such as, improved data speed, voice quality and connection stability (less dropped connections, and so on) of uplink radio bearers for priority service.

Various implementations of the system will now be described. The following description provides specific details for a thorough understanding and an enabling description of these implementations. One skilled in the art will understand, however, that the system can be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Suitable Computing Environments

FIG. 1 illustrates a telecommunications network 10 (also referred to herein as network 10) in accordance with various implementations or embodiments. The network 10 comprises a base station (BS) 12 communicatively coupled to multiple user devices, referred to as user equipment (UE) UEs 14_1, 14_2, . . . , 14_N, where N is an integer. The BS 12 serves UEs 14 located within a geographical area, for example, within a macro cell 16. FIG. 1 illustrates the macro cell 16 to be hexagonal in shape, though this is merely a schematic representation. In general, the network 10 comprises multiple macro cells 16, with each macro cell 16 including one or more BSs 12. Generally, the network 10 is made up of multiple macro cells 16. Thus, depending on the configuration and size, the network 10 can represent and serve various regional areas, for example, a city, a state, an entire nation, the whole world, etc.

The UEs 14_1, . . . , 14_N comprise any devices for communicating over a wireless communication network. Such devices include mobile telephones, cellular telephones, mobile computers, Personal Digital Assistants (PDAs), radio frequency devices, handheld computers, laptop computers, tablet computers, server computer, a client computer, a personal computer (PC), a tablet PC, a set-top box ("STB"), palmtops, pagers, integrated devices combining one or more of the preceding devices, or any machine capable of executing a set of instructions (sequential or otherwise) that specify actions to be taken by that machine. As such, UEs 14_1, . . . , 14_N can range widely in terms of capabilities and features. UEs 14_1, . . . , 14_N can also include SIM-less devices (i.e., mobile devices that do not contain a functional subscriber identity module ("SIM")), embedded SIM devices (for example, eSIM and/or iSIM devices), roaming mobile devices (i.e., mobile devices operating outside of their home access networks), and/or mobile software applications.

In some implementations, the BS 12 communicates voice traffic and/or data traffic with one or more of the UEs 14_1, . . . , 14_N. The BS 12 can communicate with the UEs 14_1, . . . , 14_N using one or more communication protocols or standards. For example, the BS 12 communicates with the UEs 14_1, . . . , 14_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), 5G NR (New Radio), and so on.

The BS 12 can be communicatively coupled (for example, using a backhaul connection, illustrated using solid lines in FIG. 1) to backhaul equipment, for example, an operation support subsystem (OSS) server 18, a radio network controller (RNC) 20, etc. The RNC 20 can also be in the form of a mobility management entity when the wireless communication network 10 operates according to the long term evolution (LTE) standard or LTE Advanced standard.

In some implementations, the base station 12 comprises processors 120, one or more transmit antennas (transmitters) 122, one or more receive antennas (receivers) 124, and computer-readable media 126. The processors 120 are configured to execute instructions, which can be stored in the computer-readable media 126 or in other computer-readable media accessible to the processors 120. In some implementations, the processors 120 are a central processing unit (CPU), a graphics processing unit (GPU), or both CPU and GPU, or any other sort of processing unit. The base station 12 can also be in the form of a Node B (where the communications network 10 is 3G UMTS network) or in the form of an eNode B (where the wireless communication network 10 operates according to the LTE standard or LTE Advanced standard). In several implementations, the base station 12 is in the form of a gNodeB (where the communications network 10 is 5G New Radio network).

The one or more transmit antennas 122 transmit signals to the UEs 14_1, . . . , 14_N, and the one or more receive antennas 124 receive signals from the UEs 14_1, . . . , 14_N. The antennas 122 and 124 include antennas known in the art. For example, antennas 122 and 124 include radio transmitters and radio receivers that perform the function of transmitting and receiving radio frequency communications. The antennas 122 and 124 can be included in a transceiver module of the BS 12.

The computer-readable media 126 includes computer-readable storage media ("CRSM"). The CRSM can be any available physical media accessible by a computing device to implement the instructions stored thereon. CRSM can include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 12. The computer-readable media 126 can reside within the base station 12, on one or more storage devices accessible on a local network to the base station 12, on cloud storage accessible via a wide area network to the base station 12, or in any other location. The computer-readable media 126 stores modules, such as instructions, data stores, and so forth that are configured to execute on the processors 120. For instance, the computer-readable media 126 stores an uplink performance optimization module 128 and a network settings module 130, as will be discussed in more detail later.

Although FIG. 1 illustrates the computer-readable media 126 in the BS 12 storing the uplink performance optimization module 128, the network settings module 130, and/or one or more other modules (not illustrated), these modules can be stored in another component of the network 10 (for example, other than the BS 12). For example, one or more of these modules can be stored in a computer-readable media included in the OSS server 18, the RNC 20, another server associated with the network 10, and so on.

The UEs 14 comprise processors 140, one or more transmit antennas (transmitters) 142, one or more receive antennas (receivers) 144, and computer-readable media 146. The processors 140 are configured to execute instructions, which are stored in the computer-readable media 146 or in other computer-readable media accessible to the processors 140. In some implementations, the processors 140 is a central processing unit (CPU), a graphics processing unit (GPU), or both CPU and GPU, or any other sort of processing unit. The one or more transmit antennas 142 transmit signals to the base station 12, and the one or more receive antennas 144 receive signals from the base station 12. The antennas 142 and 144 can be included in a transceiver module of the UE 14.

The computer-readable media 146 stores several modules, such as instructions, data stores, and so forth that are configured to execute on the processors 140. For instance, the computer-readable media 146 stores a configuration module 148. Although not illustrated in FIG. 1, the computer-readable media 146 can also store one or more applications configured to receive and/or provide voice, data and messages (for example, short message service (SMS) messages, multi-media message service (MMS) messages, instant messaging (IM) messages, enhanced message service (EMS) messages, etc.) to and/or from another device or component (for example, the base station 12, other UEs, etc.). Although not illustrated in FIG. 1, the UEs 14 can also comprise various other components, for example, a battery, a charging unit, one or more network interfaces, an audio interface, a display, a keypad or keyboard, a GPS receiver and/or other location determination component, and other input and/or output interfaces.

Although FIG. 1 illustrates only one UE (UE 14_1) in detail, each of the UEs 14_2, ..., 14_N can have a structure that is at least in part similar to that of the UE 14_1. For example, similar to the UE 14_1, each of the UEs 14_2, ..., 14_N comprise processors, one or more transmit antennas, one or more receive antennas, and computer-readable media including a configuration module.

The network settings module 130 stored in the computer-readable media 126 maintains one or more network settings associated with the network 10. Individual network settings maintained by the network settings module 130 can be pertinent to a single UE of the UEs 14_1, ..., 14_N, a subset of the UEs 14_1, ..., 14_N, or each of the UEs 14_1, ..., 14_N. For example, a network setting of the one or more network settings can specify a maximum bit rate at which each of the UEs 14_1, ..., 14_N can transmit data to the BS 12. Another network setting of one or more network settings can specify a transmit time interval (tti) used by each of the UEs 14_1, ..., 14_N to transmit data to the BS 12. Yet another network setting can specify a maximum power that each of the UEs 14_1, ..., 14_N can use to transmit data to the BS 12. One or more network settings maintained by the network settings module 130 can also include any other type of network settings.

One or more of the network settings maintained by the network settings module 130 can be communicated to the UEs 14_1, ..., 14_N (for example, by the transmit antennas 122 to the receive antennas 144 of the UEs 14_1, ..., 14_N). Based on receiving the network settings, the UEs 14_1, ..., 14_N (for example, the corresponding configuration modules 148) configure themselves and communicate with the BS 12. The application server can also be located within the OSS server 18 or the RNC 20, or be located outside the network 10. The network 10 can include multiple application servers 134.

The UEs 14 generally access or connect to the network 10 by a registration process. Likewise, the UEs 14 exit the network 10 by a de-registration process. While UEs 14 are registered with the network 10, they communicate with the base station 12 by sending and/or receiving messages, feedback and commands. Examples of messages and commands include, but are not limited to the following: power-up, power-down, quality of service, data speed request, resource request, bandwidth request, call type origination, service type, power headroom report, radio bearer, handover. The UEs 14 and/or the base station 12 can perform one or more actions upon receiving a message. Examples of actions include, but are not limited to increasing transmit power, decreasing transmit power, allocating resources, changing the format of transmission, and so on.

Figure 2:
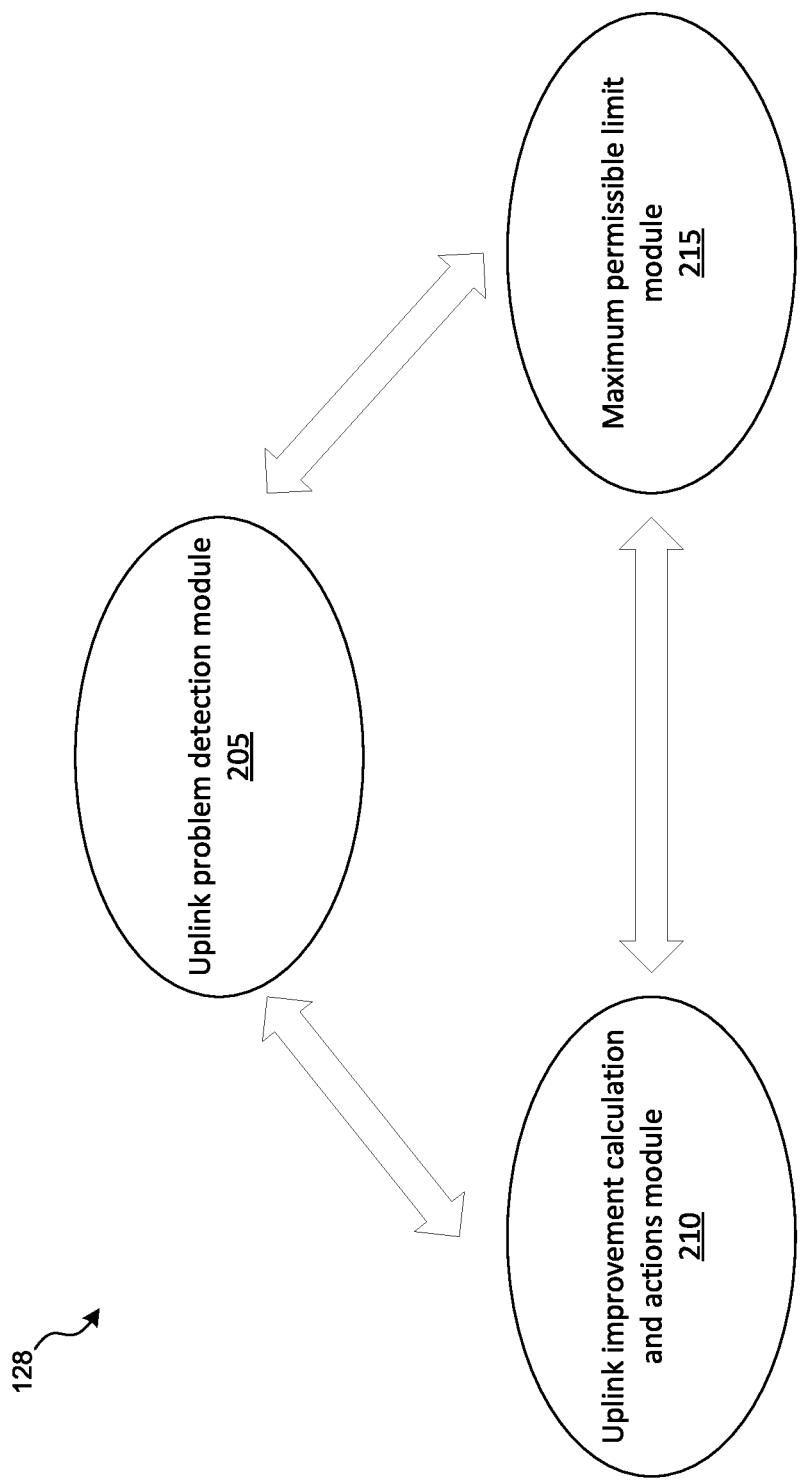
FIG. 2 illustrates components of uplink performance optimization module.

FIG. 2 illustrates components of uplink performance optimization module 128. The uplink performance optimization module 128 comprises of one or more of the following modules: uplink problem detection module 205, maximum permissible limit module 215, and uplink improvement calculation and actions module 210. The uplink problem detection module 205 detects uplink-only problems using values of one or more parameters related to bearer performance. For instance, the uplink problem detection module 205 continuously monitors the uplink performance by checking uplink transmission error and when a threshold is crossed, declares an uplink problem. The maximum permissible limit module 215 limits the actions by uplink improvement calculation and actions module 210 so that other parts in the system are not negatively affected. The uplink improvement calculation and actions module 210 determines and performs the actions to improve the uplink transmission error situation detected by the uplink problem detection module 205.

Figure 3:
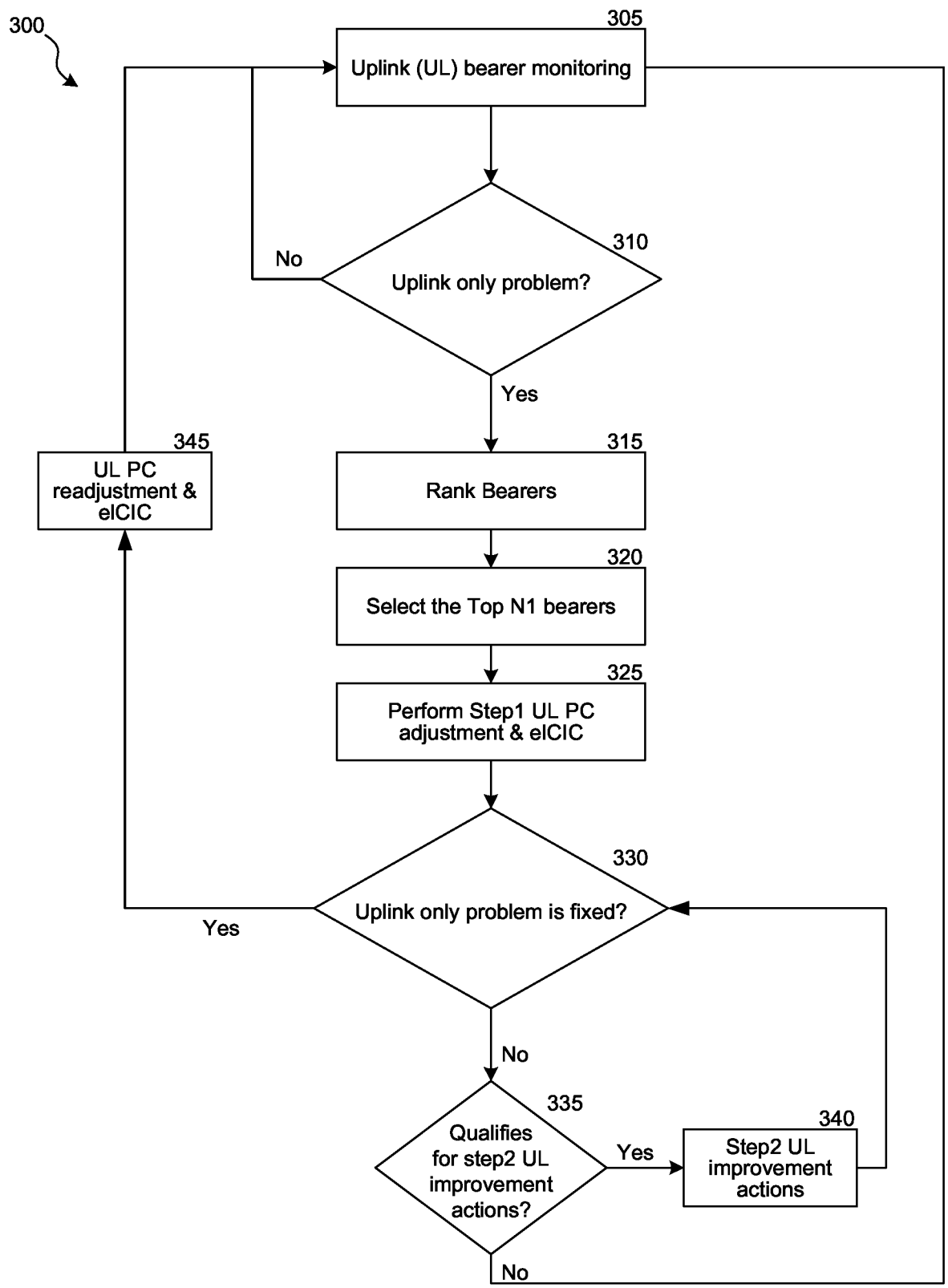
FIG. 3 is a flow diagram illustrating a process of identifying an uplink-only problem and taking actions to correct any identified problems.

FIG. 3 is a flow diagram illustrating a process 300 of identifying an uplink-only problem and taking actions to correct any identified problems according to some embodiments of the invention. Process 300 can be implemented by an uplink performance optimization module (for example, module 128 shown in FIG. 1) at a base station (for example, base station 12 shown in FIG. 1). Process 300 begins at block 305 where the process monitors and/or measures values of one or more parameters related to bearer performance. For example, process 300 can monitor and/or measure values associated with one or more of the following parameters at a base station (for example, an eNB for LTE, gNB/ng-eNodeB for 5G, and so on):

DL total Tx power: Transmitted carrier power measured over the entire cell transmission bandwidth.

DL resource block Tx power: Transmitted carrier power measured over a resource block.

DL total Tx power per antenna branch: Transmitted carrier power measured over the entire bandwidth per antenna branch.

DL resource block Tx power per antenna branch: Transmitted carrier power measured over a resource block per antenna branch.

DL total resource block usage: Ratio of downlink resource blocks used to total available downlink resource blocks (or simply the number of downlink resource blocks used).

UL total resource block usage: Ratio of uplink resource blocks used to total available uplink resource blocks (or simply the number of uplink resource blocks used).

DL resource block activity: Ratio of scheduled time of downlink resource block to the measurement period.

UL resource block activity: Ratio of scheduled time of uplink resource block to the measurement period.

DL transport network loss rate: Packet loss rate of GTP-U (or frame) packets sent by the access gateway on S1 user plane. The measurement shall be done per traffic flow. The eNB shall use the sequence numbers of GTP-U (or frame) packets to measure the downlink packet loss rate.

UL transport network loss rate: Packet loss rate of GTP-U (or frame) packets sent by the eNB on S1 user plane. The measurement shall be done per traffic flow. The access gateway shall use the sequence numbers of GTP-U (or frame) packets to measure the downlink packet loss rate.

UL RTWP: Received total wideband power including noise measured over the entire cell transmission bandwidth at the eNB.

UL received resource block power: Total received power including noise measured over one resource block at the eNB.

UL SIR (per UE): Ratio of the received power of the reference signal transmitted by the UE to the total interference received by the eNB over the UE occupied bandwidth.

UL HARQ BLER: The block error ratio based on CRC check of each HARQ level transport block.

Propagation delay: Estimated one way propagation delay measured during random access transmission.

UE Tx time difference: Time difference between the reception of the UE transmitted signal and the reference symbol transmission time instant.

Application layer packet Loss: Packet lost at the application layer can be used as an indicator of the application layer reliability. A good example is the RTP packet loss to measure service reliability of RTP based applications. A reliable measurement is in UL and between the Access node and Gateway; For example, is S1-U interface in LTE.

DL RS TX power: Downlink reference signal transmit power is determined for a considered cell as the linear average over the power contributions (in [W]) of the resource elements that carry cell-specific reference signals which are transmitted by the eNB within its operating system bandwidth.

Received Interference Power: Uplink received interference power, including the thermal noise within one physical resource block's bandwidth of 12 resource elements. The reported value shall contain a set of Received Interference Powers of physical resource blocks, $n_{PRB}=0, \ldots, N_{RB}^{UL}-1$ Thermal Noise Power: The uplink thermal noise power within the UL system bandwidth consisting of $N_{RB}^{UL}$ resource blocks. It is defined as (No×W), where No denotes the white noise power spectral density on the uplink carrier frequency and $W=N_{RB}^{UL} \cdot N_{sc}^{RB} \cdot \Delta f$ denotes the UL system bandwidth.

In several implementations, process 300 identifies a telecommunications standard associated with a bearer and selects one or more measured parameters based on the telecommunications standard of the bearer(s). For example, when process 300 determines that the bearer is associated with the 3GPP TS 36.214 standard, it selects the DL RS TX power, Received Interference Power, and Thermal Noise Power parameter measurements.

After measuring (determining) values for one or more of these parameters, at block 310, process 300 determines if an uplink-only problem exists. To do so, process 300 selects a subset of the measured parameter values and evaluates whether the measured values are indicative of an uplink-only problem. The subset of measured parameters values is selected to include parameters that indicate a degraded service in the uplink (and not the downlink). Process 300 selects a subset of the measured parameters values and compares the measured values with parameter specific threshold values (and/or a range of values). As an example, process 300 can select values for the following parameters: UL transport network loss rate, UL HARQ BLER, and Application layer packet loss. Process 300 compares values of each of these selected parameters with a threshold value (or a range of values) for that specific parameter. For example, process 300 performs the following comparisons to identify an uplink problem:

UL HARQ BLER>threshold$_{BLER}$

OR

TN Loss>threshold$_{TN-LOSS}$

OR

App Loss>threshold$_{APP-LOSS}$

In addition, to confirm that the problem is an uplink-only problem (and not also a downlink problem), process 300 evaluates values of one or more other parameters (for example, Channel Quality Indicator (CQI)). CQI is a measure reported by a UE to the network which indicates the instantaneous downlink channel quality perceived by the terminal. CQI reports can be used by the network for downlink channel-dependent scheduling and rate control. For LTE, CQI values range from 1 to 15 with a higher CQI value indicating a higher channel quality in the link. CQI values can be used to identify if a problem exists in the downlink as well (for example, when CQI<9). For example, process 300 identifies an uplink-only problem when it determines that in addition to the values of certain selected parameters being outside of their threshold values, CQI is also outside of a threshold value (or a range of threshold values).

If no uplink-only problem is identified, process 300 returns to block 305 to continue to monitor parameter values associated with various bearers. Upon identifying an uplink-only problem, process 300 proceeds to block 315 where it ranks the bearers for which it has identified an uplink-only problem. In several embodiments, process 300 ranks all bearers associated with the node. Process 300 can rank bearers based on one or more parameters, such as the types of the bearers, number of active bearers associated with the node, relationship between bearers, bearers associated with neighboring nodes (eNBs), allocation and retention policy (ARP) priority level, and so on. For example, process 300 first ranks bearers based on their ARP priority level. An ARP priority level defines a relative importance of a resource request, with 1 being the highest. If such ranking results in ties (that is, two or more bearers have the same or almost same (based on a range) priority level, then process 300 ranks the bearers by resource type (for example, Guaranteed Bit Rate (GBR) or not) and then by Quality of Service (QoS) class identifier (QCI) priority value. Resource type (GBR or not) indicates a minimum bandwidth (bit rate) to be guaranteed for a bearer. Every QCI (GBR or non-GBR) is associated with a priority. The lowest priority level corresponds to the highest priority. The QCI priority levels are used to differentiate between bearers of the same UE and are also used to differentiate between bearers from different UEs.

After process 300 ranks the bearers, it proceeds to block 320 where it selects a subset of the ranked bearers. For example, process 300 selects the top N1 number of bearers from the ranked set. The number of bearers selected (N1) can be a configurable parameter that is based on one or more of the following parameters: number of active bearers, relationship between bearers, bearers associated with neighboring nodes (eNBs), and so on. In some implementations, the number of bearers selected (N1) is determined using one or more Inter cell interference coordination/Enhanced Inter Cell Interference Coordination/Further Enhanced ICIC (ICIC/eICIC/FeICIC) methods that use various techniques like mutually exclusive resource block (RB) allocation, time domain methods or power control methods.

After selecting a subset of the ranked bearers, process 300 proceeds to block 325 and performs one or more uplink problem corrective actions. Process 300 enables the node (eNB) to send to one or more selected bearers (or UEs) a set of updated parameter values through, for example, radio resource control (RRC) messages. For example, when process 300 determines that the bearer is associated with the 3GPP TS 36.214 standard, process 300 enables the node to send one or more selected bearers a set of updated parameter values for the following parameters: $\alpha_{c(j)}$ (path loss exponent/path-loss compensation factor (for example, as mentioned in 3GPP TS 36.213) from higher layer), Po_PUSCH (target discontinuous reception (PSDRX) for each resource block used for PUSCH), Po_PUCCH (target PSDRX for each resource block used for PUCCH), and PcMaxc(i) (configured UE transmit power in subframe/slot/subslot i for serving cell c), as follows:

$\alpha_{c(j)}=1$

The new Po_PUSCH, c(j) and Po_PUCCH=max((Po_PUSCH,c(j)/Po_PUCCH)+3 dB, average PSD received in the cell from the UEs which are not considered having UL problem)

PcMaxc(i)=UE maximum power capability received by the cell in the UE capability RRC message These parameters can be used to improve the Uplink bearer performance. When the UEs receive the updated parameter values, the UEs take corrective actions in the next transmission to the node. In some implementations, all three corrective parameters are used by the UE from the next transmission. The corrective parameters are used when the bearer in question is being transmitted at that point in time. That is, the corrected parameters chosen are used by the UE only for the bearer in question. Different parameter values can be used for different telecommunication standards.

Process 300 then proceeds to block 330 (for example, after waiting for a certain period of time) where it determines if the corrective actions were successful in fixing the uplink-only problem. For example, process 300 can measure, monitor, and evaluate updated values of one or more of the parameters evaluated at block 310. In several embodiments, process 300 compares the measured values of the selected parameters with a second set of parameter specific threshold values (and/or a range of values). The second set of parameters specific threshold values can be based on the threshold values used at block 310 plus (or minus) a correction factor (that can also be parameter specific). For example, process 300 performs the following comparisons to determine whether the uplink-only problem is fixed:

UL HARQ BLER<threshold$_{BLER}$+correction factor$_{BLER}$

OR

TN Loss<threshold$_{TN\text{-}LOSS}$+correction factor$_{TN\text{-}LOSS}$

OR

App Loss<threshold$_{APP\text{-}LOSS}$+correction factor$_{APP\text{-}LOSS}$

When process 300 determines that the uplink-only problem is fixed, process 300 proceeds to block 345 where it readjusts one or more parameter values. For example, at block 345, process 300 can update values of the parameters that it adjusted at block 325. At block 345, one or more of the parameters that are adjusted at block 325 can be readjusted back to their normal values (as determined by the conventional process). At block 330, process 300 considers the over-achievement of the uplink stability (by applying the correction factor).

However, when process 300 determines that the uplink-only problem is not fixed, it proceeds to block 335 where it evaluates whether the identified bearers (for example, those identified at block 320) qualify for a second level of uplink improvement actions. Examples of uplink improvement actions include, but are not limited to prioritizing UL scheduling, Modulation and Coding Scheme (MCS) reduction and better link stability, mobility to a better cell, and so on. For instance, for prioritizing UL scheduling actions, the node configures the UEs with the identified bearers to transmit a wideband Sounding Reference Signal (SRS) that can be used to estimate the UL channel quality. This information is then used by a scheduler in the node to schedule the optimum resources for the identified bearers which can guarantee better service. For the MCS reduction and better link stability actions, the node can measure uplink channel quality and instruct the UE to use a specific MCS based on the measured value.

To reach low delay (few retransmissions), a margin to the interference variations can be included. Use of a margin can lead to limited throughput while a robust MCS is used. The risk of throughput loss or large delays in case of negative margins is reduced by using incremental redundancy for retransmissions. If the bearer in question is not a throughput sensitive one, this action can be considered. Also, the lower MCS means that a higher number of resources need to be allocated to the UE. If the node can afford a higher number of resources, this step qualifies as an action.

For the mobility to a better cell action, the node can, where appropriate, move the bearer to another cell which can serve the bearer better. The node transmits measurement control message with the same frequency and Inter frequency to the UE. Once the UE reports back the DL RSRP (downlink reference signal received power) and the UL PUSCH SINR (uplink physical uplink shared channel signal-to-interference-plus-noise ratio) are determined and compared against the current value as:

UL PUSCH SINR(target)=[UE Tx powermax−(RS Tx power−DL RSRP)]−Noise plus interference power(target)

UL PUSCH SINR(target)−UL PUSCH SINR(serving)>XdB

UL PUSCH SINR (target) is an estimated SINR assuming the UE transmits its maximum power capability UE Tx powermax. RS Tx power & Noise plus interference power (target) of the target need to be queried by the Serving eNB through the X2 interface. DL RSRP is used from the UE measurement reports. If the SINR is better than a configurable XdB, a handover procedure is initiated to this target cell. The configurable XdB is specified by an operator who may use field studies to identify an optimum value (for example, 3 dB). A larger value for this parameter makes it unable to achieve in normal circumstances and too small a value means easily achieved through momentary fluctuations of RF signal.

When one or more of the bearers qualify for one or more of the second level of uplink improvement actions, process 300 proceeds to block 340. At block 340, process 300 performs one or more of the second level of uplink improvement actions. In several embodiments, these second level of uplink improvement actions are performed on a second subset of the identified (and/or ranked bearers). For example, process 300 selects the top N2 number of bearers from the ranked subset (identified at block 320). The number of bearers selected (N2) can be a configurable parameter that is based on one or more of the following parameters: number of active bearers, relationship between bearers, bearers associated with neighboring nodes (eNBs), and so on. In some implementations, the number of bearers selected (N2) is determined using one or more Inter cell interference coordination (ICIC/eICIC/FeICIC) methods that use various techniques, like mutually exclusive RB allocation, time domain methods or power control methods. When one or more of the bearers do not qualify for one or more of the second level of uplink improvement actions, process 300 returns to block 305 to continue to monitor parameter values associated with various bearers.

Figure 4:
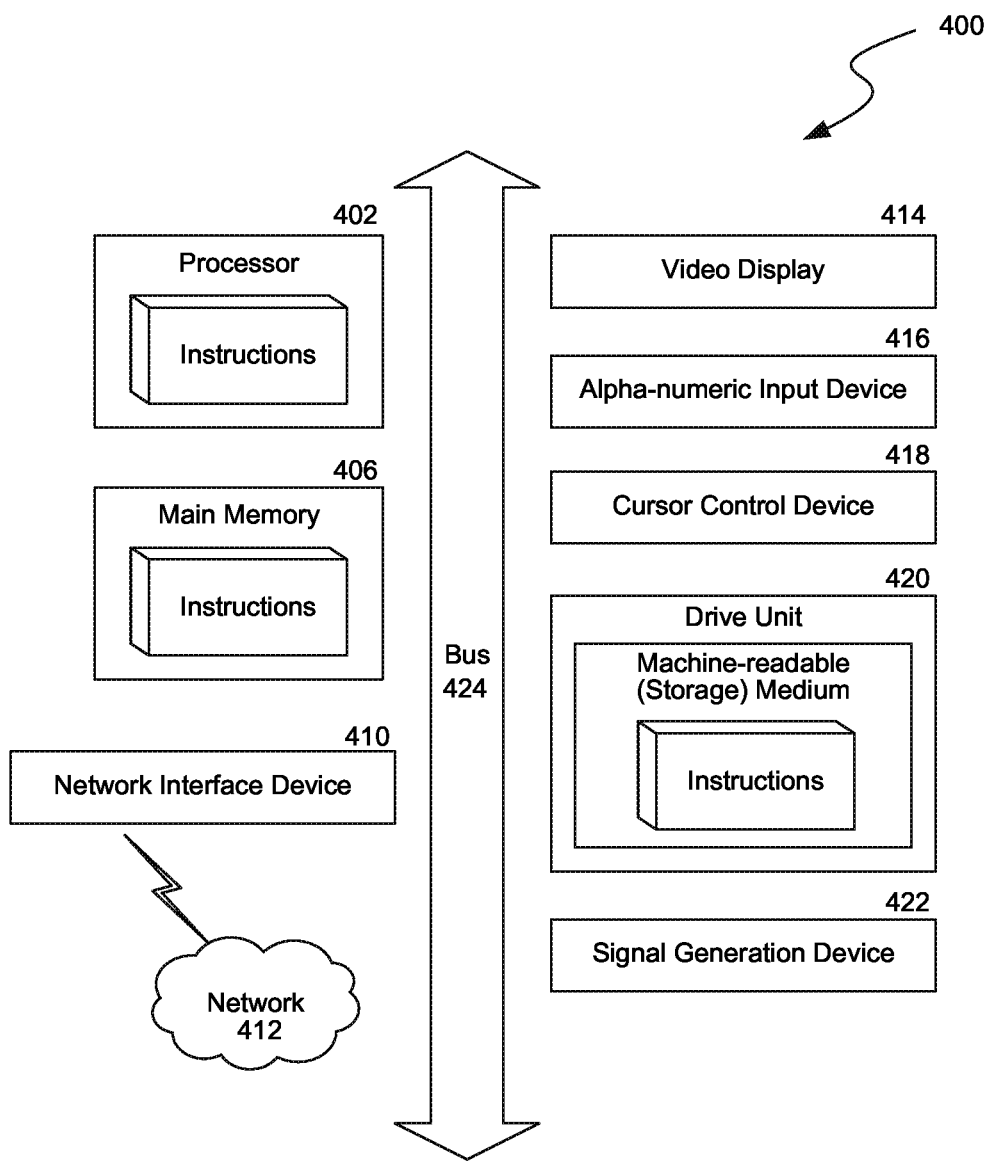
FIG. 4 is a diagrammatic representation of a machine in the example form of a computer system within which a set of instructions, for causing the machine to perform any one or more of the methodologies discussed herein can be executed.

FIG. 4 is a diagrammatic representation of a machine in the example form of a computer system or machine 400 within which a set of instructions, when executed, can cause the machine to perform any one or more of the processes (for example, process 300) described above. In some embodiments, the machine 400 operates as a standalone device, while in other embodiments, the machine 400 can be connected (for example, networked) to other machines. In a networked deployment, the machine may operate in the capacity of a server or a client user machine in a client-server network environment, or as a peer machine in a peer-to-peer (or distributed) network environment. The machine may comprise a user device, such as UEs 14_1, . . . , 14_N discussed above. In general, the machine 400 includes any electronic devices that provide voice, video and data communication. In some implementations, the machine 400 includes SIP servers or proxies (for example, S-CSCF, I-CSCF, P-CSCF, E-CSCF, BGCF/MGCF, IBCF, and the like). While a single machine is illustrated, the machine 400 can include any collection of machines that individually or jointly execute instructions to perform any of the methods described above.

The machine 400 may include a processor 402, a main memory 406 and a bus 424. The bus 424 is a subsystem for transferring data between the components of the machine 400, including transferring data between the main memory 406 and the processor 402. The bus 424 represents one or more separate physical buses, point to point connections, or both, connected by appropriate bridges, adapters, or controllers. The machine 400 can also include a display device 414, one or more input devices 416, a cursor control device 418 (for example, a mouse), a drive unit 420, a signal generation device or output device 422 (for example, a speaker, a remote control, etc.) and a network interface device 410, among others.

The processor(s) 402 controls the overall operation of the machine 400. The processor(s) 402 executes computer programs or firmware stored in memory (for example, 406, 420). The processor(s) 402 can include, one or more programmable general-purpose or special-purpose microprocessors, digital signal processors ("DSPs"), programmable controllers, application specific integrated circuits ("ASICs"), programmable logic devices ("PLDs"), trusted platform modules ("TPMs"), or the like, or a combination thereof.

The main memory 406 represents any form of memory ("RAM"), read-only memory ("ROM"), flash memory, or the like, or a combination of such devices connected to the bus 424. The drive unit 420 can include a machine-readable medium or machine-readable storage medium (such as computer readable media 126) that stores, encodes or carries one or more sets of instructions for execution by the machine 400 to perform any or all of the methods described above. It should be noted that the term "machine-readable medium" and "machine-readable storage medium" can include a single medium or multiple media (for example, a centralized or distributed database, and/or associated caches and servers) that store the one or more sets of instructions embodying any or all of the methods described above.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

The network interface device 410 allows the machine 400 to mediate data in various networks with one or more entities that are external to the machine, through any known and/or convenient communications standards and protocols supported by the machine 400 and the external entities. Example protocols supported by the machine 400 includes, but is not limited to: IP protocols for the application layer, transport layer protocols, Internet layer protocols, link layer protocols, etc. The network interface device 410 can include one or more of a network adaptor card, a wireless network interface card, a router, an access point, a wireless router, a switch, a multilayer switch, a protocol converter, a gateway, a bridge, bridge router, a hub, a digital media receiver, a repeater, or other interfaces for supporting the various protocols. Although the present disclosure describes the components and functions implemented in the embodiments with reference to particular standards and protocols that represent examples of the state of the art, the disclosure is not limited to such standards and protocols, and includes functional equivalents that can supersede the current state of the art.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative implementations can perform routines having steps, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further any specific numbers noted herein are only examples: alternative implementations can employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various implementations described above can be combined.

Any patents and applications and other references noted above, including any that can be listed in accompanying filing papers, are incorporated herein by reference. Aspects of the technology can be modified, if necessary, to employ the systems, functions, and concepts of the various references described above.

These and other changes can be made to the invention in light of the above Detailed Description. While the above description describes certain implementations of the technology, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

I claim:

1. At least one machine-readable medium, excluding transitory signals, having stored thereon instructions, which when executed by at least one machine, identifies and corrects uplink problems between bearers that are communicatively coupled to base stations in a telecommunications network,
wherein identifying the uplink problems comprises comparing determined values of a particular performance parameter among one or more performance parameters with a parameter-specific threshold values for each particular performance parameter, and
when the determined values of a threshold number of performance parameters are greater than the parameter-specific threshold values, identifying the uplink problem,
by causing the at least one machine to:
rank the bearers first based on bearer-specific parameters comprising an allocation and retention priority (ARP) level,
wherein when two or more bearers have a similar rank, adjust ranks of the two or more bearers second based on a resource type of the two or more bearers, and
wherein when two or more bearers still have a similar rank, adjust ranks of the two or more bearers third based on a Quality of Service (QoS) class identifier (QCI) priority value of the two or more bearers;
transmit at least one uplink problem corrective action to be performed at a first set of bearers among the ranked bearers,
wherein the least one uplink problem corrective action comprises transmitting updated values for one or more performance parameters associated with the bearers;
in response to transmitting the at least one uplink problem corrective action, determine whether an uplink problem is fixed; and
when the uplink problem is not fixed:
when one or more of the ranked bearers qualify for at least one second level of uplink improvement action, transmit the at least one second level of uplink improvement action to be performed at a second set of bearers among the ranked bearers.

2. The at least one machine-readable medium of claim 1, wherein the one or more performance parameters comprise:
transmitted carrier power,
number of downlink resource blocks used,
number of available downlink resource blocks,
number of uplink resource blocks used,
number of available uplink resource blocks,
scheduled time of downlink resource blocks,
scheduled time of uplink resource blocks,
measurement period,
downlink transaction power,
downlink resource block transaction power,
downlink transaction power per antenna branch,
downlink resource block transaction power per antenna branch,
downlink total resource block usage,
uplink total resource block usage,
downlink resource block activity,
uplink resource block activity,
downlink transport network loss rate,
uplink transport network loss rate,
uplink received total wideband power,
uplink received resource block power,
uplink signal to interference ratio,
uplink block error ration
propagation delay,
user equipment transmit time difference,
application layer packet loss,
downlink reference signal transmit power,
received interference power,
thermal noise power,
or any combination thereof.

3. The at least one machine-readable medium of claim 1, wherein the one or more performance parameters is selected based on a type of telecommunications standard associated with the bearers.

4. The at least one machine-readable medium of claim 1, wherein the instructions, when executed, further cause the at least one machine to:
determine values of a set of selected downlink performance parameters related to the bearers,
wherein the uplink problem is detected only when no downlink problem is detected based on the determined values of a subset of downlink performance parameters in the set of selected downlink performance parameters.

5. The at least one machine-readable medium of claim 1, wherein the bearer-specific parameters comprise:
type of bearer,
resource type,
number of active bearers associated with a base station of the base stations,
relationship among bearers in the set of bearers,
bearers associated with neighboring base stations,
allocation and retention policy priority level,
quality of service class identifier priority value,
or any combination thereof.

6. The at least one machine-readable medium of claim 1, wherein one or more of the ranked bearers or the first set of bearers is selected based on:
number of active bearers associated with a base station of the base stations,
relationship among bearers in the set of bearers,
bearers associated with neighboring base stations,
or any combination thereof.

7. The at least one machine readable medium of claim 1, wherein the ranked bearers is selected using at least one Inter cell interference coordination (ICIC/eICIC/FeICIC) method.

8. The at least one machine-readable medium of claim 1, wherein when the uplink problem is fixed, readjust values of at least one performance parameter.

9. The at least one machine-readable medium of claim 1, wherein the one or more performance parameters are determined based on type of telecommunications standard associated with bearers in the subset of bearers.

10. The at least one machine-readable medium of claim 1, wherein the instructions, when executed, further cause the at least one machine to determine whether the uplink problem is fixed by:
selecting a subset of performance parameters from the one or more performance parameters;
for each particular performance parameter in the subset of performance parameters, comparing determined values of a particular performance parameter among the one or more performance parameters with a parameter-specific threshold values for each particular performance parameter; and
when the determined values of a threshold number of performance parameters are less than the parameter-specific threshold values, determining that the uplink problem is fixed.

11. The at least one machine-readable medium of claim 1, wherein the at least one second level of uplink improvement action comprises:
prioritizing uplink scheduling,
modulation and coding Scheme (MCS) reduction,
improving link stability,
mobility to a better cell,
or any combination thereof.

12. The at least one machine-readable medium of claim 1, wherein the first set of bearers and the second set of bearers are disjoint.

13. A computer-implemented method for correcting uplink problems in a telecommunications network, the method comprising:
ranking the bearers first based on bearer-specific parameters comprising an allocation and retention priority (ARP) level,
wherein when two or more bearers have a similar rank, adjust ranks of the two or more bearers first based on a resource type of the two or more bearers, and
wherein when two or more bearers still have a similar rank, adjust ranks of the two or more bearers third based on a Quality of Service (QOS) class identifier (QCI) priority value of the two or more bearers;
transmitting at least one uplink problem corrective action to be performed at a first set of bearers among the ranked bearers,
wherein the least one uplink problem corrective action comprises transmitting updated values for one or more performance parameters associated with the bearers;
in response to transmitting the at least one uplink problem corrective action, determining whether an uplink problem is fixed; and
when the uplink problem is not fixed:
when one or more of the ranked bearers qualify for at least one second level of uplink improvement action, transmitting the at least one second level of uplink improvement action to be performed at a second set of bearers among the ranked bearers.

14. The computer-implemented method of claim 13, wherein the one or more performance parameters comprise:
transmitted carrier power,
number of downlink resource blocks used,
number of available downlink resource blocks,
number of uplink resource blocks used,
number of available uplink resource blocks,
scheduled time of downlink resource blocks,
scheduled time of uplink resource blocks,
measurement period,
downlink transaction power,
downlink resource block transaction power,
downlink transaction power per antenna branch,
downlink resource block transaction power per antenna branch,
downlink total resource block usage,
uplink total resource block usage,
downlink resource block activity,
uplink resource block activity,
downlink transport network loss rate,
uplink transport network loss rate,
uplink received total wideband power,
uplink received resource block power,
uplink signal to interference ratio,
uplink block error ration
propagation delay,
user equipment transmit time difference,
application layer packet loss,
downlink reference signal transmit power,
received interference power,
thermal noise power,
or any combination thereof.

15. The computer-implemented method of claim 13, wherein the one or more performance parameters is selected based on a type of telecommunications standard associated with the bearers.

16. The computer-implemented method of claim 13 wherein the at least one uplink problem is detected in part by:
- comparing determined values of a particular performance parameter among the one or more performance parameters with a parameter-specific threshold values for each particular performance parameter; and
- when the determined values of a threshold number of performance parameters are greater than the parameter-specific threshold values, identifying the uplink problem.

17. The computer-implemented method of claim 13, further comprising:
- determine values of a set of selected downlink performance parameters related to the bearers,
- wherein the uplink problem is detected only when no downlink problem is detected based on the determined values of a subset of downlink performance parameters in the set of selected downlink performance parameters.

18. A node in a telecommunication network comprising:
at least one processor;
at least one memory coupled to the processor, storing instructions, which when executed by the at least one processor, cause the at least one processor to:
- rank the bearers based first on bearer-specific parameters comprising an allocation and retention priority (ARP) level,
- wherein when two or more bearers have a similar rank, adjust ranks of the two or more bearers second based on a resource type of the two or more bearers, and
- wherein when two or more bearers still have a similar rank, adjust ranks of the two or more bearers third based on a Quality of Service (QOS) class identifier (QCI) priority value of the two or more bearers;
- transmit at least one uplink problem corrective action to be performed at a first set of bearers among the ranked bearers,
- wherein the at least one uplink problem corrective action comprises transmitting updated values for one or more performance parameters associated with the bearers;
- in response to transmitting the at least one uplink problem corrective action, determine whether an uplink problem is fixed; and
- when the uplink problem is not fixed:
- when one or more of the ranked bearers qualify for at least one second level of uplink improvement action, transmit the at least one second level of uplink improvement action to be performed at a second set of bearers among the ranked bearers.

19. The node of claim 18, wherein the one or more performance parameters is selected based on a type of telecommunications standard associated with the bearers.

* * * * *